US012724865B2

(12) United States Patent
Kothapally et al.

(10) Patent No.: US 12,724,865 B2
(45) Date of Patent: Sep. 1, 2026

(54) CONTINUOUS AUTHENTICATION IN A SECURITY ENVIRONMENT

(71) Applicant: International Business Machines Corporation, Armonk, NY (US)

(72) Inventors: Madhu Pavan Kothapally, Warangal (IN); Narinder Kaur, Ludhiana (IN); Namrata Kumari, Hyderabad (IN); Ray Anderson, Decatur, GA (US); Kartheek Baddukonda, West Godavari (IN)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 18/152,839

(22) Filed: Jan. 11, 2023

(65) Prior Publication Data

US 2024/0232317 A1 Jul. 11, 2024

(51) Int. Cl.

| | |
|---|---|
| ***G06F 21/33*** | (2013.01) |
| ***G06F 3/0354*** | (2013.01) |
| ***G06F 3/044*** | (2006.01) |
| ***G06F 21/12*** | (2013.01) |
| ***G06F 21/44*** | (2013.01) |

(52) U.S. Cl.

CPC ........ *G06F 21/335* (2013.01); *G06F 3/03545* (2013.01); *G06F 3/0441* (2019.05); *G06F 3/0442* (2019.05); *G06F 21/121* (2013.01); *G06F 21/44* (2013.01); *G06F 2221/2137* (2013.01); *G06F 2221/2151* (2013.01)

(58) Field of Classification Search

None

See application file for complete search history.

(56) References Cited

U.S. PATENT DOCUMENTS

| | | | |
|---|---|---|---|
| 7,082,213 B2 | 7/2006 | Black | |
| 9,329,703 B2 | 5/2016 | Falkenburg et al. | |
| 9,946,886 B2 | 4/2018 | Engelhardt et al. | |
| 10,237,058 B2 | 3/2019 | Aihara et al. | |
| 10,785,021 B1 * | 9/2020 | Prabhat ................ | H04L 9/0863 |
| 2002/0178369 A1 | 11/2002 | Black | |

(Continued)

FOREIGN PATENT DOCUMENTS

| | | |
|---|---|---|
| EP | 1668670 A2 | 6/2006 |
| EP | 3304258 B1 | 11/2020 |

OTHER PUBLICATIONS

Anonymous, "A Method and System for Enhancing Security Levels of Confidential Content based on a Configuration of a Stylus," An IP.com Prior Art Database Technical Disclosure, IPCOM000238791D, Sep. 18, 2014, 3 pages.

(Continued)

*Primary Examiner* — Benjamin E Lanier
*Assistant Examiner* — Felicia Farrow
(74) *Attorney, Agent, or Firm* — Yee & Associates, P.C.

(57) ABSTRACT

A computer implemented method for authentication using a stylus. The stylus generates a stylus token using a key stored in the stylus and a current timestamp, wherein the stylus token is valid for a selected period of time. The stylus transmits the stylus token to a computer system. The stylus repeats generating the stylus token using the key stored in the stylus and the current timestamp and transmitting the stylus token to the computer system in response to the stylus token expiring after the selected period of time.

18 Claims, 14 Drawing Sheets

(56) References Cited

U.S. PATENT DOCUMENTS

| | | | | |
|---|---|---|---|---|
| 2006/0023922 | A1 | 2/2006 | Black | |
| 2008/0309621 | A1* | 12/2008 | Aggarwal | G06F 3/03545 345/173 |
| 2010/0139992 | A1 | 6/2010 | Delia et al. | |
| 2013/0106800 | A1* | 5/2013 | Yilmaz | G06F 3/0442 345/179 |
| 2014/0375573 | A1* | 12/2014 | Idzik | G06F 3/0346 345/173 |
| 2015/0286810 | A1 | 10/2015 | Lebert | |
| 2017/0109516 | A1* | 4/2017 | Engelhardt | G06F 3/0441 |
| 2018/0089470 | A1 | 3/2018 | Chiarella et al. | |
| 2021/0349597 | A1* | 11/2021 | Luo | G06F 3/0383 |

OTHER PUBLICATIONS

Coppock, "Microsoft Files Patent Application for Pen-Based Authentication Technology | Digital Trends," May 1, 2017, Copyright Digital Trends Media Group, a Designtechnica Company, Accessed on Nov. 29, 2022, 3 pages. https://www.digitaltrends.com/computing/microsoft-patent-application-indicates-pen-windows-hello-authentication-technology/.

Khan et al., "Geographic Location Based Authentication System," International Journal of Innovative Research in Science, Engineering and Technology, vol. 6, Issue 8, Aug. 2017, 8 pages.

* cited by examiner

CONTINUOUS AUTHENTICATION IN A SECURITY ENVIRONMENT

BACKGROUND

1. Field

The disclosure relates generally to an improved computer system and more specifically to an authentication system for continuous authentication of a user.

2. Description of the Related Art

Security essential environments include secure locations such as data centers and server rooms. With these types of locations multiple levels of authentication are typically performed before allowing a user to enter the premises of a secure location. The multiple levels of authentication to enable physical access to a secure location can include key card matching, biometrics, password authentication, and other security measures. Biometrics can include, for example, using fingerprint matching, retina matching, or a combination thereof.

Once a user has been allowed access to the secure location, other types of security measures are used within the secure location. For example, session management can be performed using a single sign-on (SSO) or token-based authentication. These and other mechanisms can be used to determine whether the user has access to use a particular computing device, use particular software, perform a selected action, or other type of access within the secure location.

SUMMARY

According to one illustrative embodiment, a computer implemented method for authentication using a stylus. The stylus generates a stylus token using a key stored in the stylus and a current timestamp. The stylus token is valid for a selected period of time. The stylus transmits the stylus token to a computer system. The stylus repeats generating the stylus token using the key stored in the stylus and the current timestamp and transmitting the stylus token to the computer system in response to the stylus token expiring after the selected period of time. According to other illustrative embodiments, an authentication system and a computer program product for authenticating using a stylus are provided.

According to another illustrative embodiment, a stylus comprises an elongate body, a memory in the elongate body, a near field communications transmitter in the elongate body, a variable capacitance unit in the elongate body a controller in the elongate body. A key is stored in the memory. The near field communications transmitter transmits radio frequency signals. The variable capacitance unit transmits a stylus capacitance in response to touching a capacitive sensor. The controller operates to generate a stylus token using the key stored in the memory in the stylus and a current timestamp. The stylus token is valid for a first selected period of time. The controller operates to control the near field communications transmitter to transmit the stylus token using the radio frequency signals. The controller operates to determine a stylus capacitance using the key stored in the memory and the current timestamp. The controller operates to control the variable capacitance unit to transmit the stylus capacitance to the computer system in response to the stylus touching capacitive sensor in communication with the computer system. The stylus capacitance is valid for a second selected period of time. The controller operates to repeat generating the stylus token using the key stored in the memory in the elongate body and the current timestamp and controlling the near field communications unit to transmit the stylus token using the radio frequency signals in response to the stylus token expiring after the first selected period of time. The controller operates to repeat determining the stylus capacitance using the key stored in the memory and the current timestamp in response to an expiration of second selected period of time.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
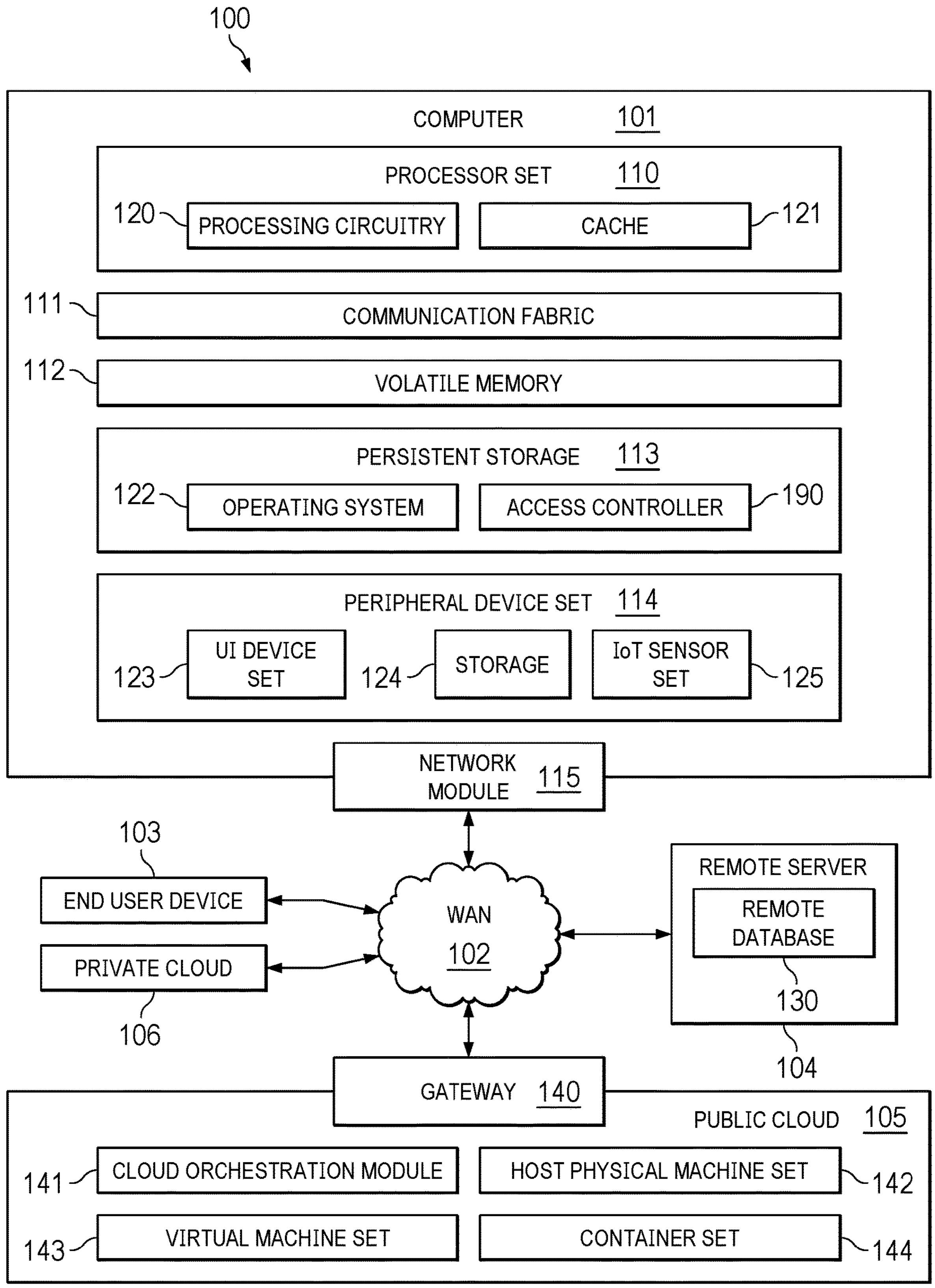
FIG. 1 is a block diagram of a computing environment in which illustrative embodiments can be implemented.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as access controller 190. In addition to access controller 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and access controller 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in access controller 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in access controller 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of considerations as described herein. For example, the illustrative embodiments recognize and take into account that after a user has gained physical access to secure location and has been authenticated or validated to use a computing device in a secure location, additional authentication is typically not performed.

However, this type of access control may not provide a desired level of security. For example, a security breach can occur when a computing device in a secure location is left unattended by a user. It is desirable to ensure that the user remains in close proximity to the computing device.

A stylus such as a smart pen can be associated with the computing device. User contact with the smart pen can be used to ensure that the user remains in close proximity to the computing device by monitoring whether the user interacts with the computing device using the smart pen. A lack of interaction with computing device using the smart pen over a preselected period of time can be interpreted as leaving the computing device unattended. With this situation, the user can be blocked and required to reauthenticate using another authentication mechanism such as a user ID and password entry, a key card, or other mechanism.

This type of system, however, does not determine whether the user is in close proximity to the computing device. Some security mechanisms can be used by a user through a handwritten password using a physical data recording pen or entering a code for inserting a smart card into the computing device. These mechanisms can store information for verifying the identity of the user in possession of a stylus in the form of a biometric, a password, signature, or gesture. However, these mechanisms do not provide continuous authentication of the user of a stylus.

In the illustrative examples, tokens or capacitance based on a key associated with the user can be generated for continuous authentication of the user in possession of the stylus. For example, a token can be generated based on a key and a current timestamp by the stylus. The stylus token is valid for a selected period of time in this example. This token can be transmitted by the stylus periodically.

As another example, a stylus capacitance can be generated based on the key and a current timestamp by the stylus. The stylus capacitance can be valid for another selected period of time. In these examples, the stylus capacitance is valid for a longer period of time as compared to the token.

The stylus capacitance can be transmitted to a computing device in a computer system in response to the stylus touching or contacting capacitance sensing device that is in communication with the computer system. In this example, a first component is in communication with a second component when the first component is capable of sending information to the second component. For example, the capacitance sensing device is in communication with computer system when the capacitive sensor is capable of sending the stylus capacitance detected from the stylus to the computing device. This stylus capacitance can be sent by the capacitance sensing device to the computer system using at least one of electrical signal, a wireless signal, or an optical signal in these illustrative examples.

In another illustrative example, the stylus can determine the location of the stylus using a global positioning system unit in the stylus. This location can be transmitted for analysis. The location can be used to determine whether the user is in a location that would cause the user to be blocked from having access. In another example, multiple locations can be used to determine a path movement to determine whether the user should be blocked from having access.

The location or path can also be based on a time of day to determine whether the location or movement of the user is normal resulting in continuing to allow the user access. If the location or movement is not normal for the user, the user can be blocked access. In this situation, the user may be requested to read authenticate through another indication mechanism. Whether the location or movement of user is considered to be normal can be determined by comparing the location for movement of the user to historical locations and movement for the user.

Figure 2:
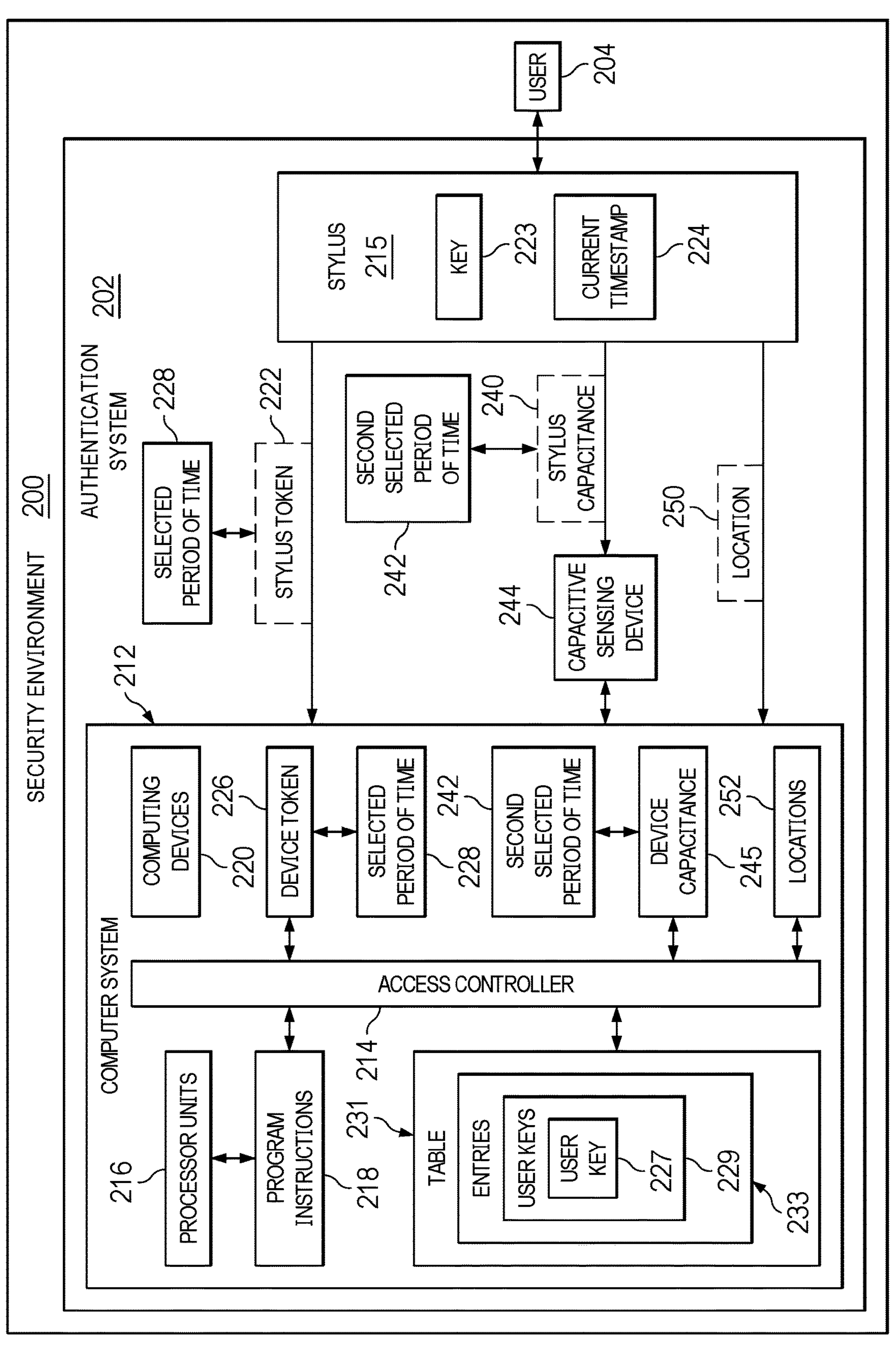
FIG. 2 is a block diagram of a security environment in accordance with an illustrative embodiment.

With reference now to FIG. 2, a block diagram of a security environment is depicted in accordance with an illustrative embodiment. In this illustrative example, security environment 200 includes components that can be implemented in hardware such as the hardware shown in computing environment 100 in FIG. 1.

In this illustrative example, authentication system 202 in security environment 200 can continuously authenticate user 204. The components in authentication system 202 that can perform this authentication include computer system 212, access controller 214, and stylus 215. As depicted, access controller 214 is located in computer system 212.

Access controller 214 can be implemented in software, hardware, firmware or a combination thereof. When software is used, the operations performed by access controller 214 can be implemented in program instructions configured to run on hardware, such as a processor unit. When firmware is used, the operations performed by access controller 214 can be implemented in program instructions and data and stored in persistent memory to run on a processor unit. When hardware is employed, the hardware can include circuits that operate to perform the operations in access controller 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program instructions that operate a computer. A processor unit can be implemented using processor set 110 in FIG. 1. When the number of processor units 216 executes program instructions 218 for a process, the number of processor units 216 can be one or more processor units that are on the same computer or on different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this example, the authentication of user 204 can be performed by authentication system 202 to access a number of computing devices 220 in computer system 212. As depicted, stylus 215 can be held or carried by user 204 and stylus 215 can operate to authenticate user 204 to use one or more of computing devices 220.

In authenticating user 204, stylus 215 can generate stylus token 222 using key 223 stored in stylus 215 and current timestamp 224. In this example, stylus token 222 is valid for selected period of time 228.

As depicted, stylus 215 transmits stylus token 222 to computer system 212. In this illustrative example, the communication between stylus 215 and computer system 212 is unidirectional. In other words, the communication of stylus 215 with computer system 212 is one way from stylus 215 to computer system 212. For example, stylus 215 sends stylus token 222 to computer system 212 and does not receive information from computer system 212.

In this illustrative example, stylus token 222 is transmitted by stylus 215 to computer system 212 using a near field communications protocol (NFC). The near field communication protocol can be selected such that stylus 215 is near computer system 212 for stylus token 222 to be transmitted from stylus 215 to computer system 212 . In this example, computer system 212 can be one or more of computing devices 220.

As result, stylus 215 can be used for authentication when stylus 215 is within proximity of a computing device based on the ability for the computing device to receive stylus token 222. In this manner, user 204 can be required to be within a selected distance of a computing device to continue to be authenticated to use that computing device. This distance can be selected based on the type of communication protocol used by stylus 215 to send stylus tokens to computer system 212.

Using near field communications protocol, communication can be a distance of 4 cm or less. In other examples, other types of communications can be used such as Bluetooth. The selection of the particular type of communication can depend on the distance at which stylus 215 should be with respect to computer system 212.

In these examples, stylus token 222 can be transmitted by stylus 215 to computer system 212 on a periodic basis. For example, stylus token 222 can be transmitted every 0.5 seconds, 1.0 seconds, 3 seconds, 10 seconds, 1 minute, or after some other period of time.

In this example, stylus 215 repeats generating stylus token 222 using key 223 stored in stylus 215 and current timestamp 224 and transmitting stylus token 222 to computer system 212 in response to stylus token 222 expiring after selected period of time 228. Each time stylus token 222 is generated, stylus token 222 is different because current timestamp 224 is different when stylus token 222 is regenerated.

With the use of stylus token 222, access controller 214 generates device token 226 using user key 227 in user keys 229 for user 204 and current timestamp 224. In this example, device token 226 is also valid for selected period of time 228.

In this illustrative example, user keys 229 can be stored in entries 233 in a data structure such as table 231. The table can include entries for users accessing security environment 200. For example, an entry in entries 233 in table 231 can include a stylus number, a user identifier, a user key, and a status.

The stylus number uniquely identifies a stylus such as stylus 215 and its assignment to user based on the user identifier. The user identifier can be, for example, an email address. In this example, user key 227 is the same as key 223 for the stylus assigned to the user. The status indicates whether the user has access or is blocked from access to one or more of computing devices 220 in computer system 212.

In this illustrative example, access controller 214 can identify user 204 based on a session login or other login to computer system 212. For example, user can login to use a specific computing device in computing devices 220. In this example, stylus token 222 can be transmitted to that computing device in computing devices 220 in computer system 212. Based on that identification, user key 227 assigned to user 204 in user keys 229 can be identified and used to generate device token 226.

Access controller 214 compares stylus token 222 with the device token 226 in response to receiving stylus token 222 from stylus 215. Access controller 214 authorizes user 204 access to computer system 212 in response to a match between the stylus token 222 and device token 226. In this example, this process can be performed each time stylus 215 transmits stylus token 222 to computer system 212. This transmission results in access controller 214 authenticating user 204.

If a match between device token 226 and stylus token 222 is absent, access controller 214 blocks user 204 from accessing computer system 212. In this situation, user 204 can gain access to computer system 212 by performing other authentication processes. For example, user 204 can enter a user password and login, use a key part, or some other authentication mechanism. In this manner, stylus 215 can be used to provide continuous authentication of user 204 to access computer system 212.

In this illustrative example, another continuous access authentication feature, involves stylus 215 determining stylus capacitance 240 using key 223 stored in stylus 215 and current timestamp 224. Stylus capacitance 240 is a value measured in farads (F).

In this example, stylus capacitance 240 is valid for a second selected period of time 242. Stylus 215 transmits stylus capacitance 240 to computer system 212 in response to stylus 215 touching capacitive sensor 244 in communication with computer system 212. Capacitive sensor 244 can be, for example, a touchscreen, a trackpad, or other device that can detect stylus capacitance 240.

Stylus 215 repeats determining stylus capacitance 240 using key 223 stored in stylus 215 and current timestamp 224 in response to an expiration of second selected period of time 242. In this example, second selected period of time 242 for stylus capacitance 240 can be different from selected period of time 228 or stylus token 222. For example, second selected period of time 242 for stylus capacitance 240 can be longer than selected period of time 228 for stylus token 222. The selection can be made when less values are available for stylus capacitance 240 as compared to stylus token 222.

Access controller 214 generates device capacitance 245 using user key 227 for user 204 and current timestamp 224. In this example, device capacitance 245 is also valid for second selected period of time 242. These periods of time can also be referred to as windows during which stylus token 222, device token 226, stylus capacitance 240, and device capacitance 245 are valid.

Access controller 214 compares stylus capacitance 240 with device capacitance 245 in response to receiving stylus capacitance 240 from stylus 215. Access controller authorizes user 204 access to computer system 212 in response to a match between stylus capacitance 240 and device capacitance 245.

In these illustrative examples, current timestamp 224 identified at preselected times by access controller 214 and stylus 215 such that the correct timestamp is used to generate tokens and determine capacitance. For example, current timestamp 224 can be determined at the beginning of a window or period of time. For example, both stylus 215 and access controller 214 can be synchronized to determine current timestamp 224 at the beginning of selected period of time 228 for generating stylus token 222 and device token 226.

In a similar fashion, current timestamp 224 can be determined at the time at which second selected period of time 242 begins for use in generating stylus capacitance 240 and device capacitance 245. In this example, both computer system 212 and stylus 215 can be synchronized to a particular time source.

As depicted, access controller 214 blocks user 204 from accessing computer system if the match is absent between stylus capacitance 240 and device capacitance 245. In this case, user 204 and gain access by performing a different authentication process.

In this illustrative example, another security measure in authentication system 202 can involve using location 250 of stylus 215. For example, stylus 215 can determine location 250 of stylus 215 using a global positioning system sensor in the stylus 215.

Stylus transmits location 250 computer system 212. In this example, location 250 can be transmitted periodically from stylus 215 to computer system 212. As a result, computer system 212 can store a set of locations 252 for stylus 215. As used herein, a "set of" when used with reference items means one or more items. For example, a set of locations is one or more locations.

The set of locations can be locations received from stylus 215 over time. Additionally, stylus 215 can transmit a timestamp with each location transmitted to computer system 212. As a result, the movement of stylus 215 can be tracked over time.

Access controller 214 can determine whether to block access to user 204 of stylus 215 based on the set of locations 252 received for stylus 215. This determination can be made using a policy or process. For example, the location of stylus 215 can be used to determine whether user 204 is in an unauthorized location for user 204. If user 204 is an unauthorized location, access to computer system 212 can be blocked by access controller 214. This blocking of user 204 in an unauthorized location can be performed without providing any notification to user 204. In other examples, user 204 can be requested to confirm the location of user 204 for continued access to computer system 212.

As another example, with multiple locations in the set of locations 252, a pattern of movement can be determined for the user 204. This pattern of movement can be compared to expected patterns of movement for user 204. If the expected patterns of movement are present for a particular point in time, access controller 214 can block user 204 from accessing computer system 212. In this manner, locations for stylus 215 can also be used to continuously authenticate user 204 two access computer system 212.

In one illustrative example, one or more solutions are present that overcome a problem with continuously authenticating a user to use one or more computing devices 220 in computer system 212. As a result, one or more solutions can enable continuously authenticating a user through stylus tokens and stylus capacitances transmitted from stylus 215 to computer system 212.

In these examples, each stylus carried by a user has a different key. The stylus can be assigned to the user when the user enters a particular security environment. Additionally, the location of a user as determined by the stylus associated with or assigned to the user can also be used authenticate the user for access to the computer system. If the location of the user is not an expected location, access to the user may be blocked. In this instance, the user may be too far from an authorized computing device to allow access. In another case, another user may have picked up stylus 215.

Thus, authentication system 202 can operate to validate user 204 to use computer system 212. In these examples, the validation of user 204 can be for using a set of computing devices 220 in computer system 212. A set of computing devices 220. In this example, the validation can be performed at periods of time selected to be such essentially a continuous validation of user 204 using stylus 215. Further, through the use of locations 252 transmitted by stylus 215, access controller 214 can also track the location of user 204 to determine whether access should continue to be granted to user 204.

The illustration of security environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more users and one or more styluses in addition to user 204 and stylus 215 can be present in security environment 200. These additional users and their styluses can be authenticated by access controller 214. In another illustrative example, stylus 215 may not transmit location 250. In yet other illustrative examples, only one of stylus capacitance 240 or stylus token 222 may be transmitted by stylus 215 and used authenticate user 204.

Figure 3:
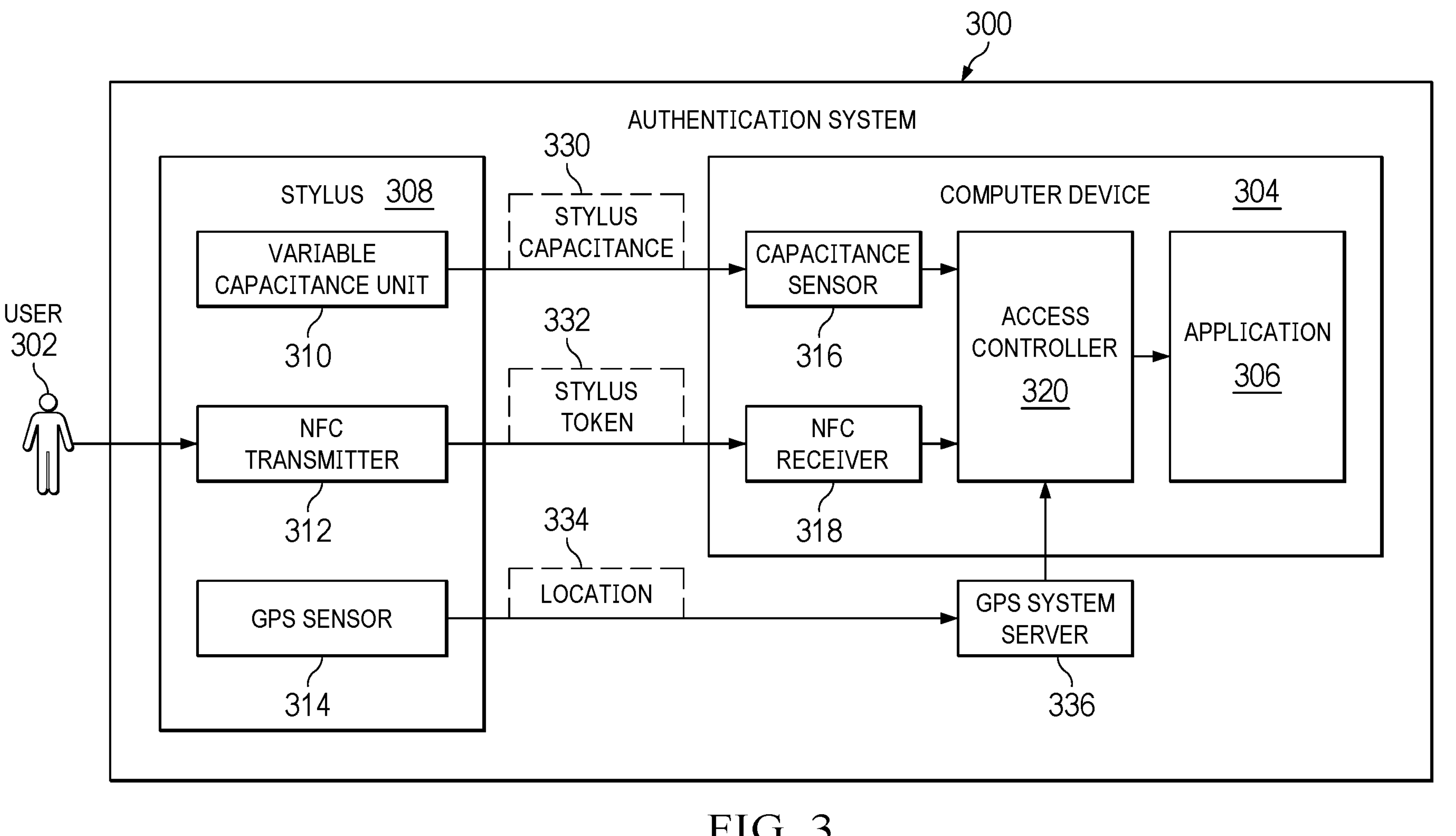
FIG. 3 is a block diagram of an authentication system in accordance with an illustrative embodiment.

Turning next to FIG. 3, a block diagram of an authentication system is depicted in accordance with an illustrative embodiment. In this illustrative example, authentication system 300 is an example of one implementation for authentication system 202 in FIG. 2. In this illustrative example, user 302 has been authenticated to operate computing device 304. Computing device 304 is an example of the computing device and computing devices 220 in FIG. 2.

In this example, user 302 has been authorized to use application 306 located in computing device 304. This authentication can be performed using a user ID and password, a biometric, a smartcard, or some other authentication system.

In this illustrative example, continued authentication of user 302 to computing device 304 can be performed using stylus 308. In this example, the continued authentication of user 302 can be performed using various components in stylus 308 and computing device 304. Stylus 308 is an example of stylus 215 in FIG. 2.

As depicted, stylus 308 comprises variable capacitance unit 310, near field communications (NFC) transmitter 312, and global positioning system (GPS) sensor 314. In this example, computing device 304 includes capacitance sensor 316, near field communications (NFC) receiver 318, and access controller 320. Access controller 320 is an example of access controller 214 in FIG. 2.

As depicted, variable capacitance unit 310 in stylus 308 can generate and transmit stylus capacitance 330 that is detected by capacitance sensing sensor 316 connected to computing device 304. The stylus capacitance can be used by access controller 320 to determine whether user 302 has continued access to computing device 304.

Additionally, near field communications (NFC) transmitter 312 can transmit stylus token 332 that is detected by near field communications receiver 318 and used by access controller 320 to determine whether user 302 should have continued access to computing device 304. In this example, user 302 with stylus 308 can be required to be within some selected distance of computing device 304 for stylus token 332 to be received by near field communications receiver 318 for use by access controller 320 to continue to authenticate user 302.

Further in this example, global positioning system (GPS) sensor 314 can transmit location 334 of stylus 308 to global positioning system server 336. This location can be obtained by access controller 320 from global positioning system server 336 and used in determining whether user 302 should have continued access to computing device 304.

Figure 4:
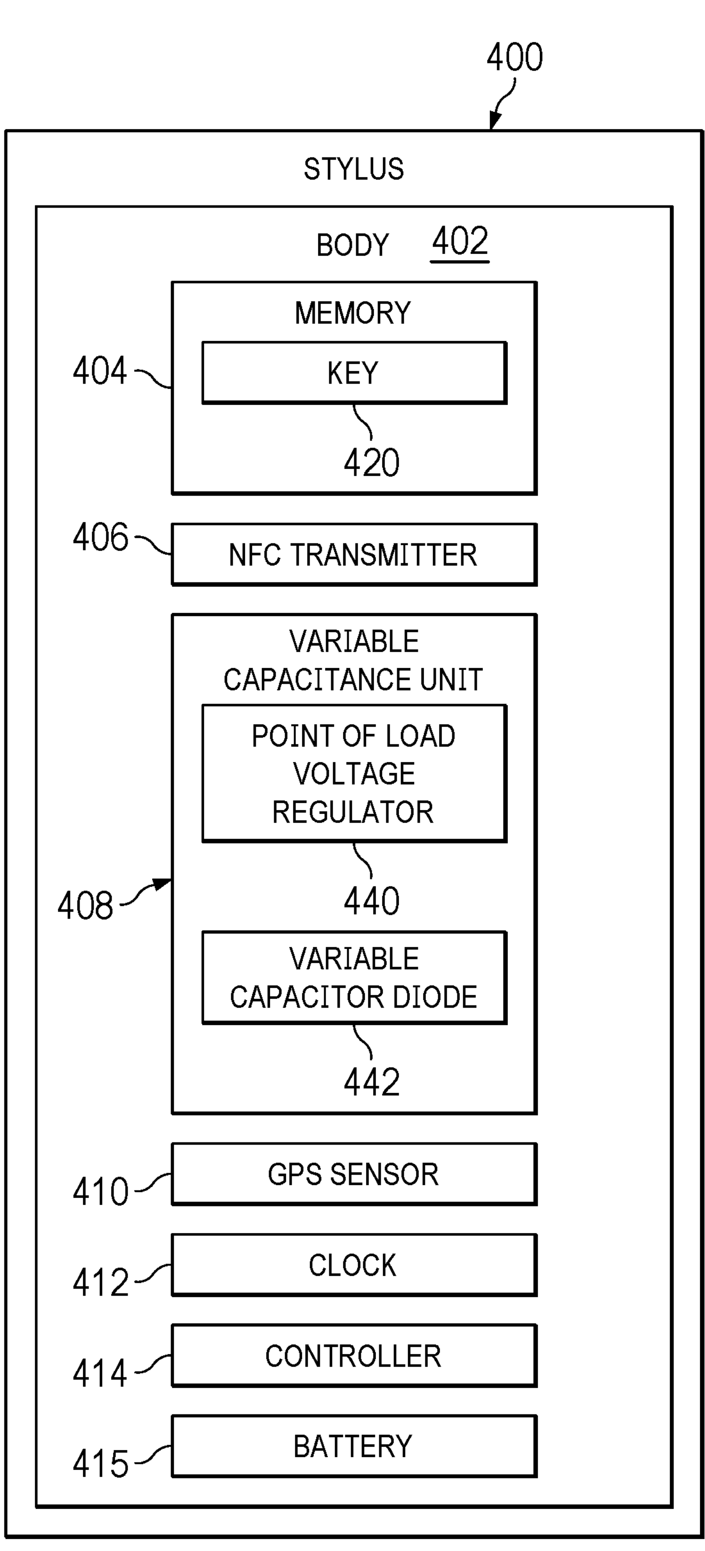
FIG. 4 is a block diagram of a stylus in accordance with an illustrative embodiment.

Turning next to FIG. 4, a block diagram of a stylus is depicted in accordance with an illustrative embodiment. In this illustrative example, stylus 400 is an example of an implementation for stylus 215 in FIG. 2 and stylus 308 in FIG. 3.

As depicted, stylus 400 comprises body 402, which can be an elongate body. Body 402 comprises a structure that holds components for stylus 400. These components include, for example, memory 404, near field communications (NFC) transmitter 406, variable capacitance unit 408, global positioning system (GPS) sensor 410, clock 412, battery 415 and controller 414.

In this example, memory 404 stores key 420. In this example, controller 414 can use key 420 in memory 404 along with a current timestamp obtained from clock 412 to generate a stylus token that can be transmitted by near field communications (NFC) transmitter 406.

A stylus capacitance that can be transmitted by variable capacitance unit 408. As depicted, variable capacitance unit 408 includes point of load voltage (POL) regulator 440 and variable capacitor (varicap) diode 442. In this depicted example, controller 414 controls point of load voltage regulator 440 that is communication with variable capacitor diode 442 to transmit stylus capacitance. Controller 414 can modulate point of load voltage regulator 440 to cause variable capacitor diode 442 to generate the stylus capacitance that is transmitted to a capacitance sensing device in response to stylus 400 contacting or touching a capacitance sensor.

In this example, global positioning system sensor 410 can transmit the location of stylus 400. Battery 415 provides power for stylus 400.

This illustration of stylus 400 is an example of one implementation of a stylus that can be used in the different illustrative examples are not meant to limit the manner in which the stylus can be implemented for other illustrative examples. Additional components can be present that are not shown in this example. For example, connection ports for power and programming of stylus 400 can be present. As another example, global positioning system sensor 410 can be omitted in some illustrative examples. In another illustrative example, one is near field communications (NFC) transmitter 406 and variable capacitance unit 408 may also be omitted in other illustrative examples.

Figure 5:
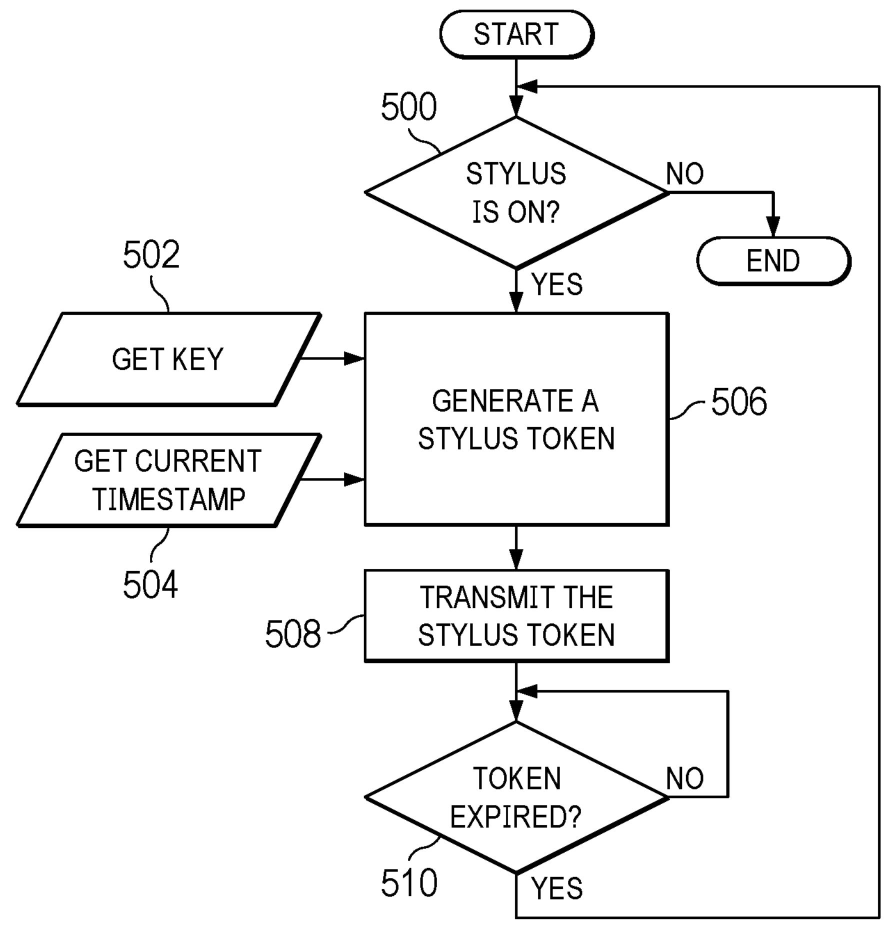
FIG. 5 is a flowchart of a process for transmitting a stylus token in accordance with an illustrative embodiment.

With reference next to FIG. 5, a flowchart of a process for transmitting a stylus token is depicted in accordance with an illustrative embodiment. The process in FIG. 5 can be implemented in hardware, software, or both. When implemented in software, the process can take the form of program instructions. The process depicted in this figure can be implemented in a stylus such as stylus 215 in FIG. 2, stylus 308 in FIG. 3, and stylus 400 in FIG. 4.

The process begins by determining whether the stylus is on (step 500). If the stylus is not on, the process terminates. Otherwise, the stylus gets the key (step 502), and gets a current timestamp (step 504) and generates a stylus token using the key and the current timestamp (step 506). The stylus token is a temporal token that is valid only for a selected period of time.

The process transmits the stylus token (step 508). In step 508, the stylus token can be transmitted using a near field communications protocol. A determination is made as to whether the stylus has expired (step 510). If the stylus token has not expired, the process returns to step 510. Otherwise, the process returns to step 500 as described above.

In this example, the stylus can generate and transmit stylus tokens to continuously authenticate the user as long as the stylus is turned on. The stylus token transmitted by the stylus is used to authenticate the user.

Figure 6:
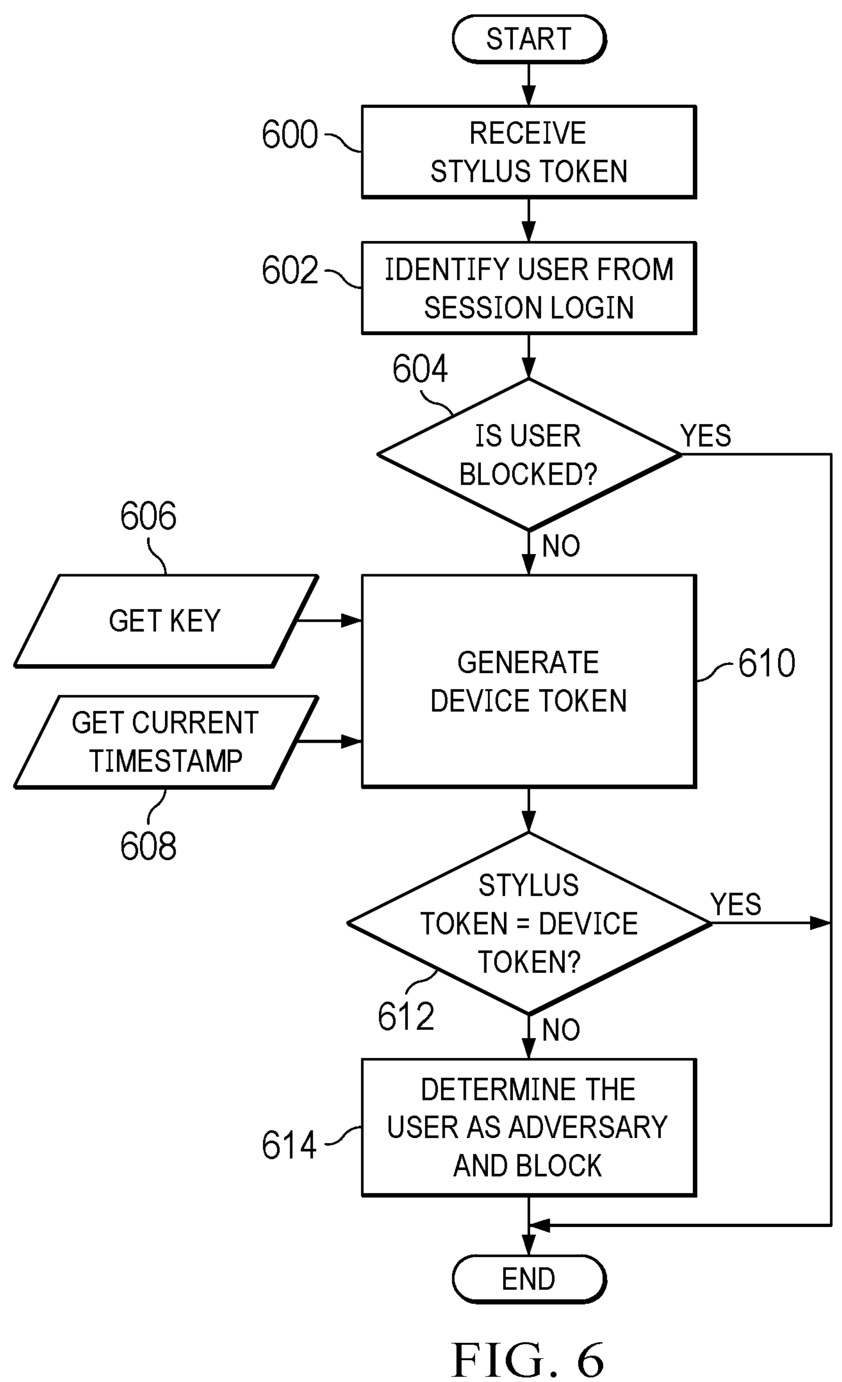
FIG. 6 is a flowchart of a process for receiving a stylus token in accordance with an illustrative embodiment.

With reference next to FIG. 6, a flowchart of a process for receiving a stylus token is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. The process illustrated in FIG. 6 can be implemented in an access controller, such as access controller 214 in FIG. 2 and access controller 320 in FIG. 3.

The process begins by receiving a stylus token (step 600). The process identifies the user from a session login (step 602). In this example, the user has been logged in to use a particular computing device for which the stylus token has been received.

The process determines whether the user has been blocked (step 604). If the user has been blocked, the process terminates. Otherwise, the process gets a key (step 606) and gets a current timestamp (step 608). The process uses the key and the timestamp to generate a device token (step 610). The process determines whether the stylus token matches the device token (step 612). If a match is present, the process terminates. In this instance, the user continues to be authenticated.

With reference again to step 612, if a match is absent, the process determines that the user is an adversary and blocks the user from accessing the computing device (step 614). The process terminates thereafter.

Figure 7:
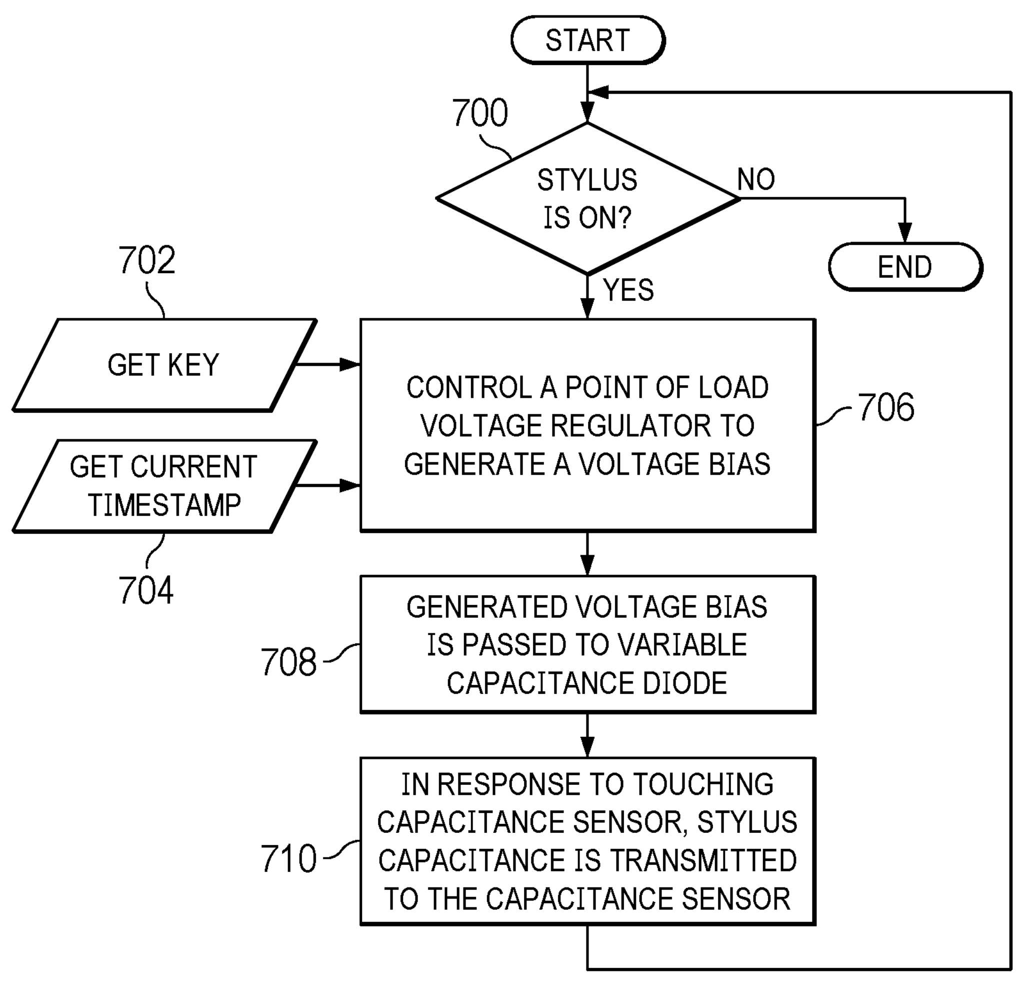
FIG. 7 is a flowchart of a process for transmitting a stylus capacitance in accordance with an illustrative embodiment.

With reference next to FIG. 7, a flowchart of a process for transmitting a stylus capacitance is depicted in accordance with an illustrative embodiment. The process in FIG. 7 can be implemented in hardware, software, or both. When implemented in software, the process can take the form of program instructions. The process depicted in this figure can be implemented in a stylus such as stylus 215 in FIG. 2, stylus 308 in FIG. 3, and stylus 400 in FIG. 4.

The process begins by determining whether the stylus is on (step 700). If the stylus is not on, the process terminates. Otherwise, the stylus gets the key (step 702), and gets a current timestamp (step 704). The process controls a point of load voltage regulator to generate a voltage bias (step 706). The process passes the voltage bias to a variable capacitance diode (step 708). In step 708, this voltage is used by the variable capacitance diode to generate the stylus capacitance. The process transmits stylus capacitance in response to detecting the capacitance sensor (step 710). The process then returns to step 700.

Figure 8:
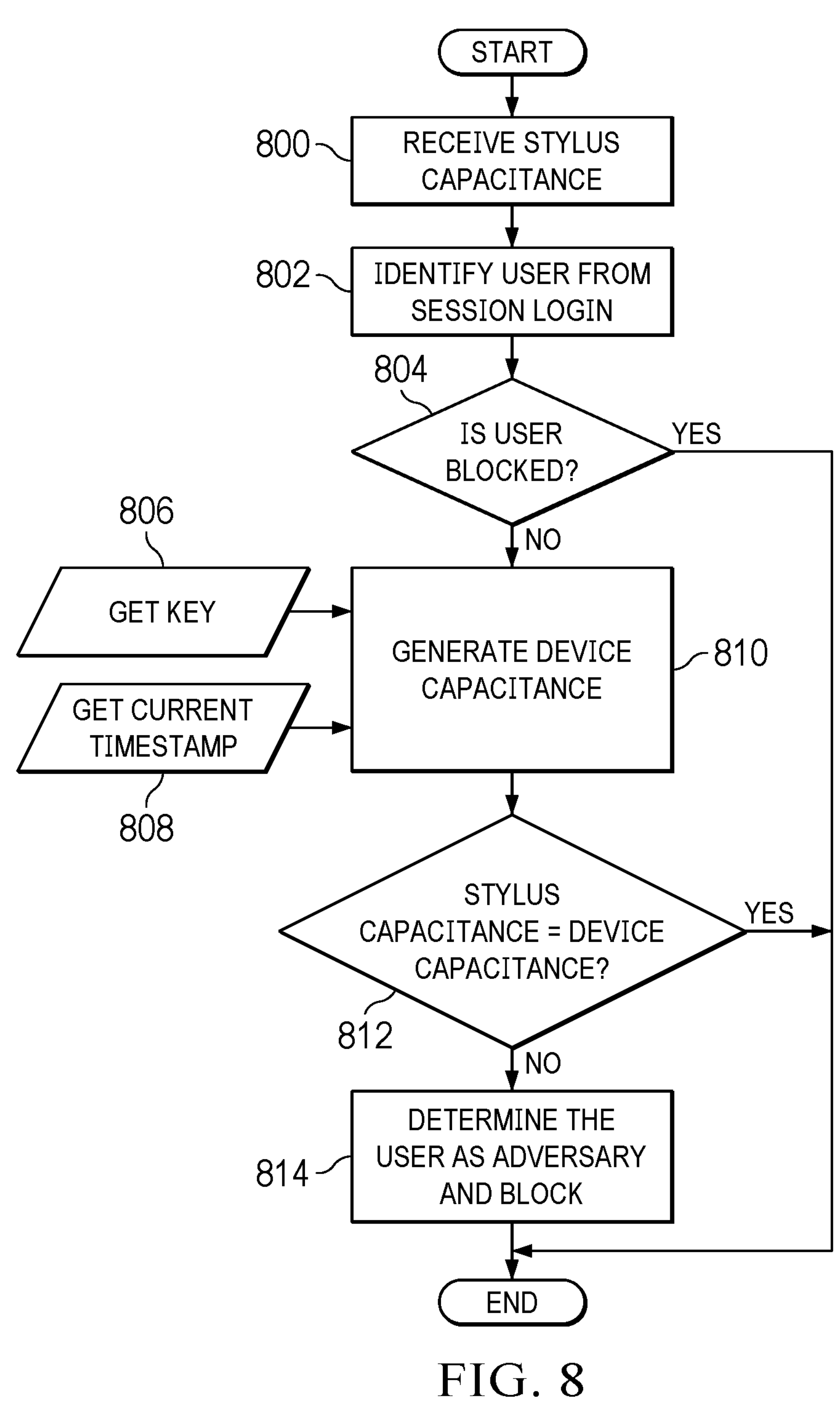
FIG. 8 is a flowchart of a process for receiving a stylus token in accordance with an illustrative embodiment.

With reference next to FIG. 8, a flowchart of a process for receiving a stylus token is depicted in accordance with an illustrative embodiment. The process in FIG. 8 can be implemented in hardware, software, or both. When implemented in software, the process can take the form of program instructions that is run by one of more processor units located in one or more hardware devices in one or more computer systems. The process illustrated in FIG. 8 can be implemented in an access controller, such as access controller 214 in FIG. 2 and access controller 320 in FIG. 3.

The process begins by receiving a stylus capacitance (step 800). The process identifies the user from a session login (step 802). In this example, the user has been logged in to use a particular computing device for which the stylus token has been received.

The process determines whether the user has been blocked (step 804). If the user has been blocked, the process terminates. Otherwise, the process gets a key (step 806) and gets a current timestamp (step 808). The process uses the key and the current timestamp to generate a device capacitance (step 810). In step 810, the device capacitance is a capacitance value.

The process determines whether the stylus capacitance matches the device capacitance (step 812). If a match not present, the process terminates. In this instance, the user continues to be authenticated.

With reference again to step 812, if a match is not present, the process determines that the user is an adversary and blocks the user from accessing the computing device (step 814). The process terminates thereafter.

Figure 9:
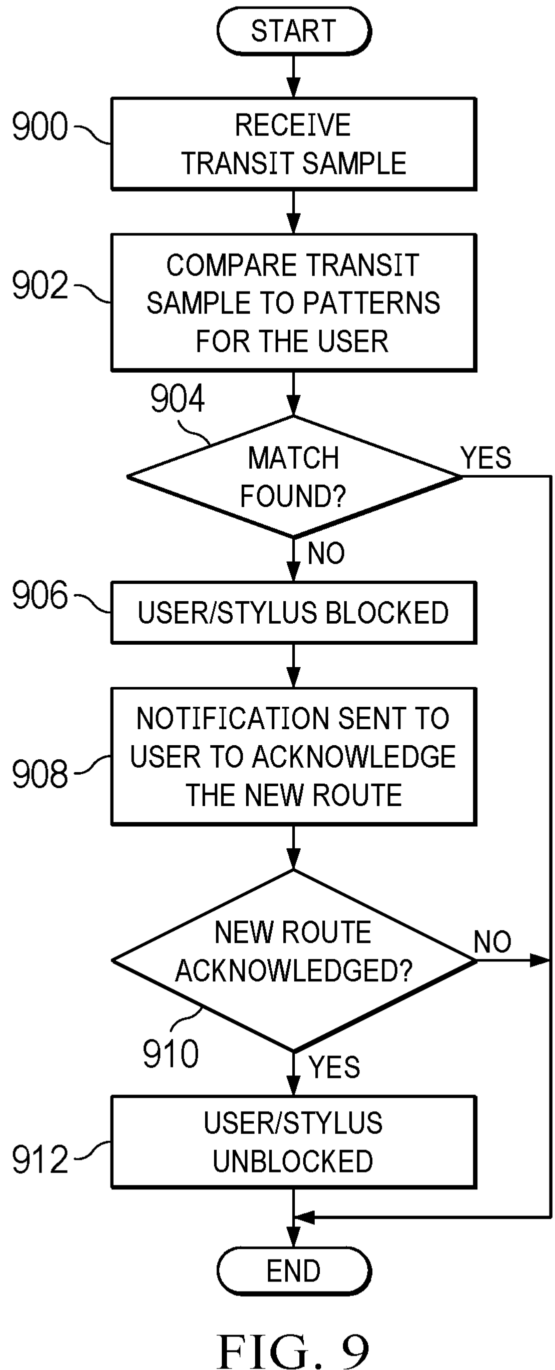
FIG. 9 is a flowchart of a process for processing locations of a stylus token in accordance with an illustrative embodiment.

With reference next to FIG. 9, a flowchart of a process for processing locations of a stylus token is depicted in accordance with an illustrative embodiment. The process in FIG. 9 can be implemented in hardware, software, or both. When implemented in software, the process can take the form of program instructions that is run by one of more processor units located in one or more hardware devices in one or more computer systems. The process illustrated in FIG. 9 can be implemented in an access controller, such as access controller 214 in FIG. 2 and access controller 320 in FIG. 3.

The process begins by receiving a transit sample (step 900). In step 900, a transit sample is a set of locations for the stylus. Additionally, the transit sample also includes a timestamp for each of the locations.

The process compares the transit sample to patterns for the user (step 902). The comparison made in step 902 can be performed using a database of patterns of movement for user and a policy to compare the transit sample to the patterns of movement. In another illustrative example, the comparison can be made using machine learning model that has been trained using historical patterns of movement for the user.

A determination is made as to whether a match is present between the transit sample and the patterns (step 904). If a match is present, the process terminates.

Otherwise, the stylus and user are blocked (step 906). In step 906, both the stylus and user can be blocked from access. For example, the stylus may not be used to access the computing device. Additionally, the user can also be blocked such that the user cannot use a different input device such as a keyboard or mouse to access the computing device without re-authentication.

The process sends a notification to the user requesting acknowledgment of the new route indicated by the transit sample (step 908). A determination is made as to whether the new route has been acknowledged (step 910). In step 910, the user can acknowledge that the user and stylus has traveled to a new location. This indicates that a new route has been taken by the user and the stylus. This acknowledgment can be used to indicate that the stylus is still in the possession of the user.

In response to acknowledging the new route, the process unblocks the user and stylus (step 912) with the process terminating thereafter. Further, with the acknowledgment of the new route, that information can be used to update the patterns of movement for the user.

With reference again to step 910, if the user does not acknowledge the new route, the process terminates with the user and stylus remaining blocked.

Figure 10:
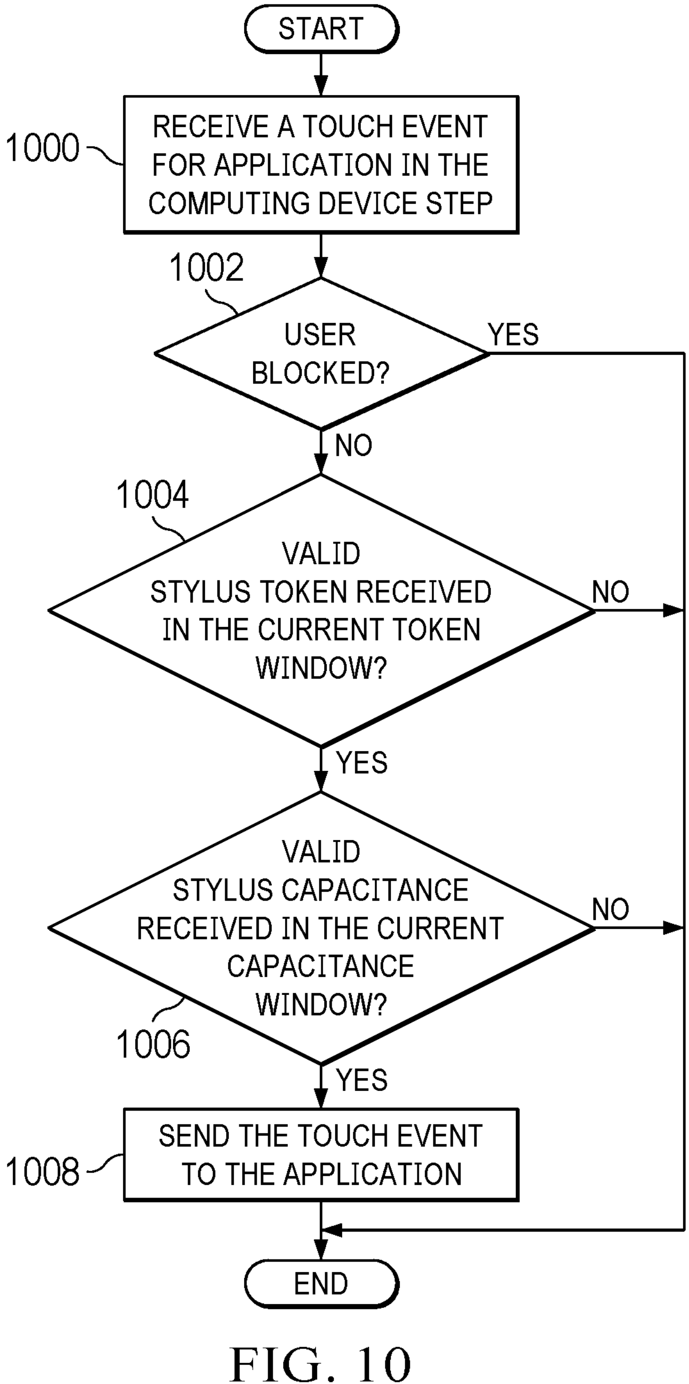
FIG. 10 is a flowchart of a process for authenticating a user in accordance with an illustrative embodiment.

Turning next to FIG. 10, a flowchart of a process for authenticating a user is depicted in accordance with an illustrative embodiment. The process in FIG. 10 can be implemented in hardware, software, or both. When implemented in software, the process can take the form of program instructions that is run by one of more processor units located in one or more hardware devices in one or more computer systems. The process illustrated in FIG. 10 can be implemented in an access controller, such as access controller 214 in FIG. 2 and access controller 320 in FIG. 3.

The process begins by receiving a touch event for application in the computing device (step 1000). In this example, the touch event can be a selection of a control or other components displayed by the application. The touch event is identified based on the detection of the stylus capacitance at a location on a touchscreen on which the different controls or components are displayed. For example, the touch event can be the selection of a menu item, a slider, text, or some other controller or component displayed on the touchscreen.

The process determines whether the user has been blocked (step 1002). If the user has been blocked, the process terminates. Otherwise, the process determines whether a valid stylus token has been received in the current token window (step 1004). In step 1004, the current token window is a period of time during which the token is valid. Further, in step 1004, a determination of whether a valid stylus token has been received can be determined using the steps in FIG. 6.

If a stylus token has not been received in the current token window, the process terminates. Otherwise, the process determines whether a valid stylus capacitance has been received in the current capacitance window (step 1006). Step 1006, the capacitance window is a period of time during which during which the stylus capacitance is valid. In this example, current capacitance window is longer than the valid stylus token window. Further, the determination of whether a valid stylus capacitance has been received can be performed using the steps in FIG. 8.

If a valid stylus capacitance has been received during the current capacitance window, the process sends the touch event to the application (step 1008). The process terminates thereafter. With reference again to step 1006, if a valid stylus capacitance has not been received during the current capacitance window, the process terminates.

In this manner, a user can be continuously authenticated using different features in the depicted example. In this example, a stylus token and a stylus capacitance are used to determine whether access to an application of the computing device occurs.

Figure 11:
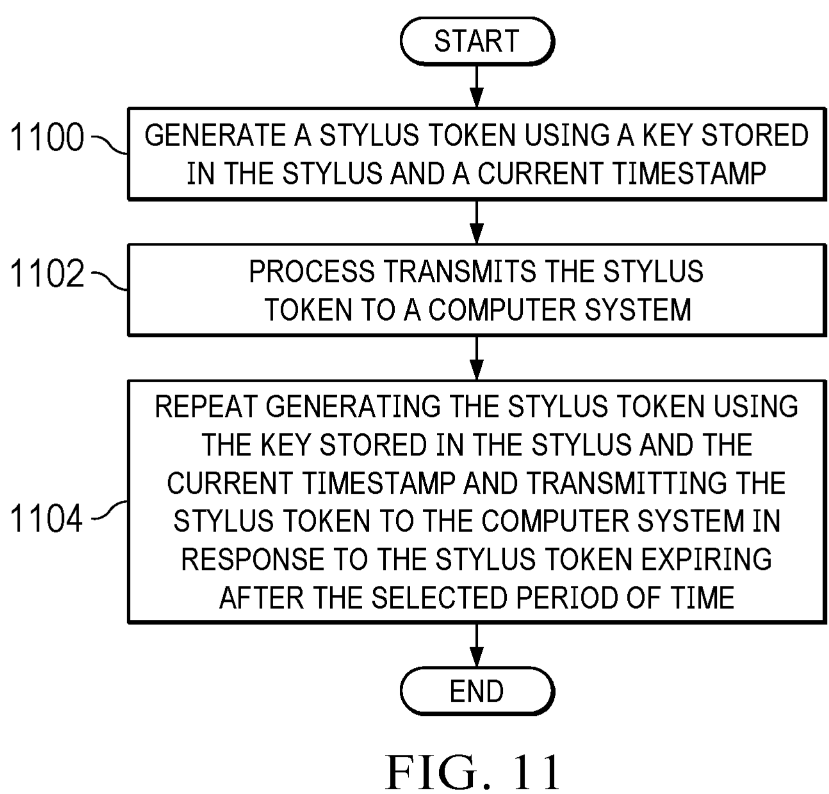
FIG. 11 is a flowchart of a process for authentication using a stylus token in accordance with an illustrative embodiment.

With reference now to FIG. 11, a flowchart of a process for authentication using a stylus token is depicted in accordance with an illustrative embodiment. The process in FIG. 11 can be implemented in hardware, software, or both. When implemented in software, the process can take the form of program instructions. The process depicted in this figure can be implemented in a stylus such as stylus 215 in FIG. 2, stylus 308 in FIG. 3, and stylus 400 in FIG. 4.

The process begins by generating a stylus token using a key stored in the stylus and a current timestamp (step 1100). In step 1100, the stylus token is valid for a selected period of time. The process transmits the stylus token to a computer system (step 1102).

The process repeats generating the stylus token using the key stored in the stylus and the current timestamp and transmitting the stylus token to the computer system in response to the stylus token expiring after the selected period of time (step 1104). The process terminates thereafter.

Figure 12:
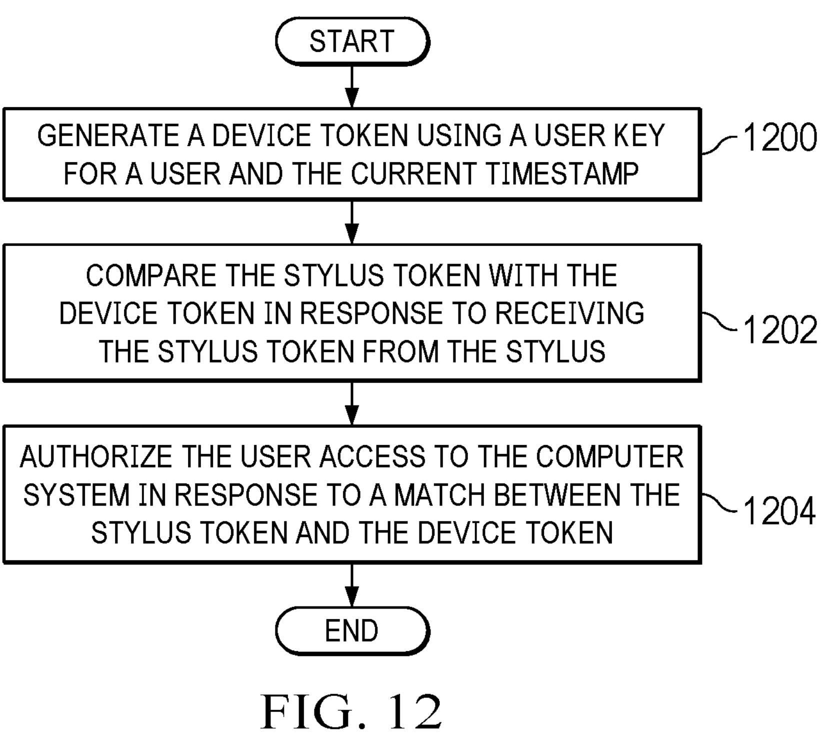
FIG. 12 is a flowchart of a process for receiving a stylus token in accordance with an illustrative embodiment.

With reference next to FIG. 12, a flowchart of a process for receiving a stylus token is depicted in accordance with an illustrative embodiment. The process in FIG. 12 can be implemented in hardware, software, or both. When implemented in software, the process can take the form of program instructions that is run by one of more processor units located in one or more hardware devices in one or more computer systems. The process illustrated in FIG. 12 can be implemented in an access controller, such as access controller 214 in FIG. 2 and access controller 320 in FIG. 3.

The process begins by generating a device token using a user key for a user and the current timestamp (step 1200). The process compares the stylus token with the device token in response to receiving the stylus token from the stylus (step 1202).

The process authorizes the user access to the computer system in response to a match between the stylus token and the device token (step 1204). The process terminates thereafter.

Figure 13:
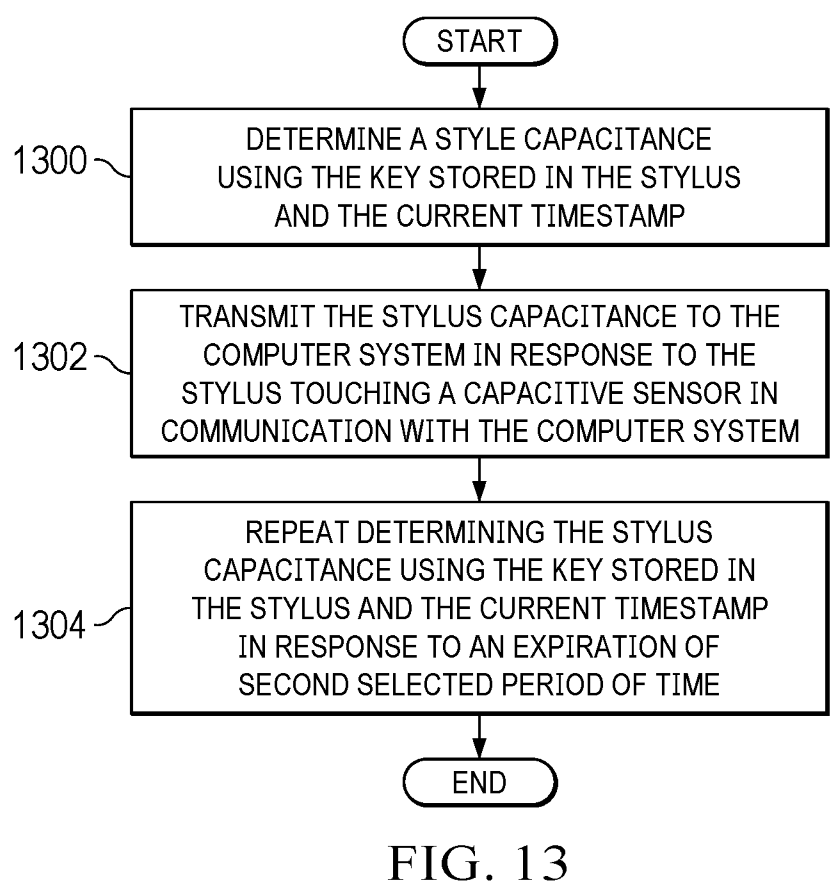
FIG. 13 is a flowchart of a process for authentication using a stylus capacitance in accordance with an illustrative embodiment.

With reference now to FIG. 13, a flowchart of a process for authentication using a stylus capacitance is depicted in accordance with an illustrative embodiment. The process in FIG. 13 can be implemented in hardware, software, or both. When implemented in software, the process can take the form of program instructions. The process depicted in this figure can be implemented in a stylus such as stylus 215 in FIG. 2, stylus 308 in FIG. 3, and stylus 400 in FIG. 4.

The process begins by determining a stylus capacitance using the key stored in the stylus and the current timestamp (step 1300). In step 1300, the stylus capacitance is valid for a second selected period of time. The process transmits the stylus capacitance to the computer system in response to the stylus touching a capacitive sensor in communication with the computer system (step 1302).

The process repeats determining the stylus capacitance using the key stored in the stylus and the current timestamp in response to an expiration of the second selected period of time (step 1304). The process terminates thereafter.

Figure 14:
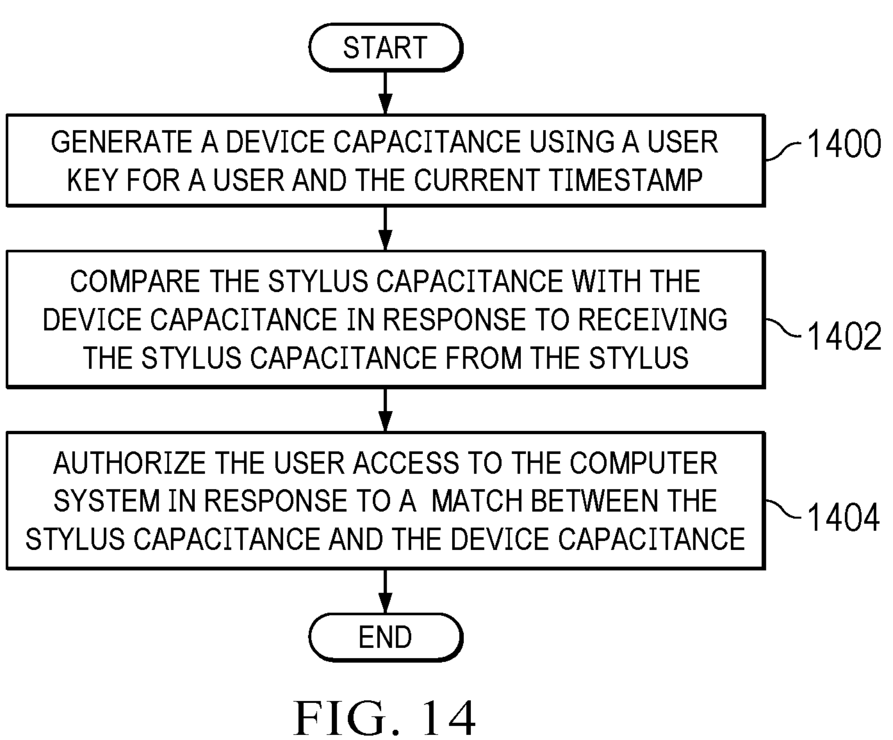
FIG. 14 is a flowchart of a process for receiving a stylus capacitance in accordance with an illustrative embodiment.

With reference next to FIG. 14, a flowchart of a process for receiving a stylus capacitance is depicted in accordance with an illustrative embodiment. The process in FIG. 14 can be implemented in hardware, software, or both. When implemented in software, the process can take the form of program instructions that is run by one of more processor units located in one or more hardware devices in one or more computer systems. The process illustrated in this figure can be implemented in an access controller, such as access controller 214 in FIG. 2 and access controller 320 in FIG. 3.

The process begins by generating a device capacitance using a user key for a user and the current timestamp (step 1400). The process compares the stylus capacitance with the device capacitance in response to receiving the stylus capacitance from the stylus (step 1402).

The process authorizes the user access to the computer system in response to a match between the stylus capacitance and the device capacitance (step 1404). The process terminates thereafter.

Figure 15:
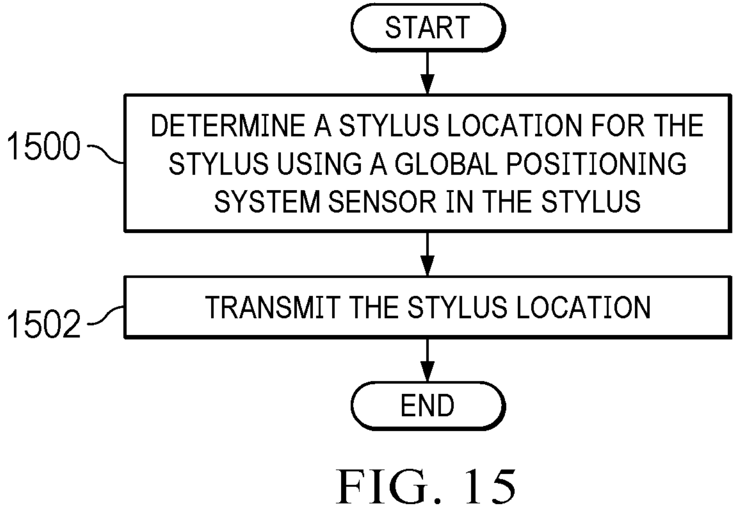
FIG. 15 is a flowchart of a process transmitting locations from a stylus in accordance with an illustrative embodiment.

With reference now to FIG. 15, a flowchart of a process transmitting locations from a stylus is depicted in accordance with an illustrative embodiment. The process in FIG. 15 can be implemented in hardware, software, or both. When implemented in software, the process can take the form of program instructions. The process depicted in this figure can be implemented in a stylus such as stylus 215 in FIG. 2, stylus 308 in FIG. 3, and stylus 400 in FIG. 4.

The process begins by determining a stylus location for the stylus using a global positioning system sensor in the stylus (step 1500). The process transmits the stylus location (step 1502). The process terminates thereafter.

Figure 16:
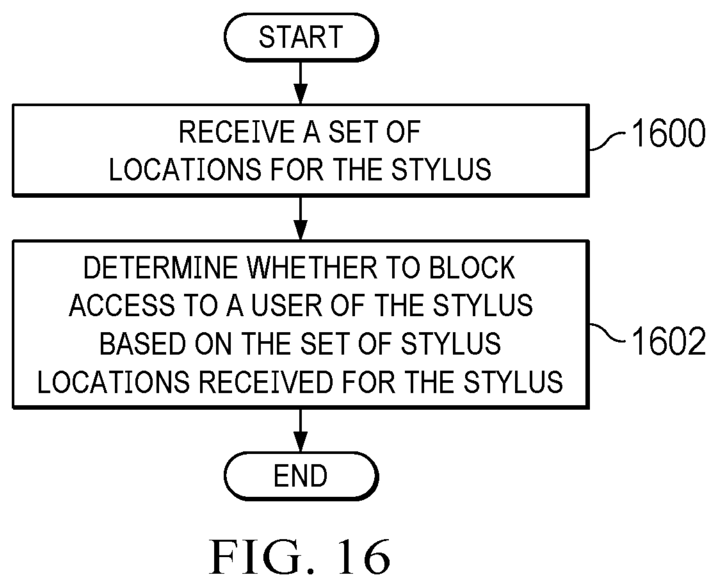
FIG. 16 is a flowchart of a process for receiving locations from a stylus in accordance with an illustrative embodiment.

With reference next to FIG. 16, a flowchart of a process for receiving locations from a stylus is depicted in accordance with an illustrative embodiment. The process in FIG. 16 can be implemented in hardware, software, or both. When implemented in software, the process can take the form of program instructions that is run by one of more processor units located in one or more hardware devices in one or more computer systems. The process illustrated in FIG. 16 can be implemented in an access controller, such as access controller 214 in FIG. 2 and access controller 320 in FIG. 3.

The process begins by receiving a set of locations for the stylus (step 1600). The process determines whether to block access to a user of the stylus based on the set of stylus locations received for the stylus (step 1602). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 17:
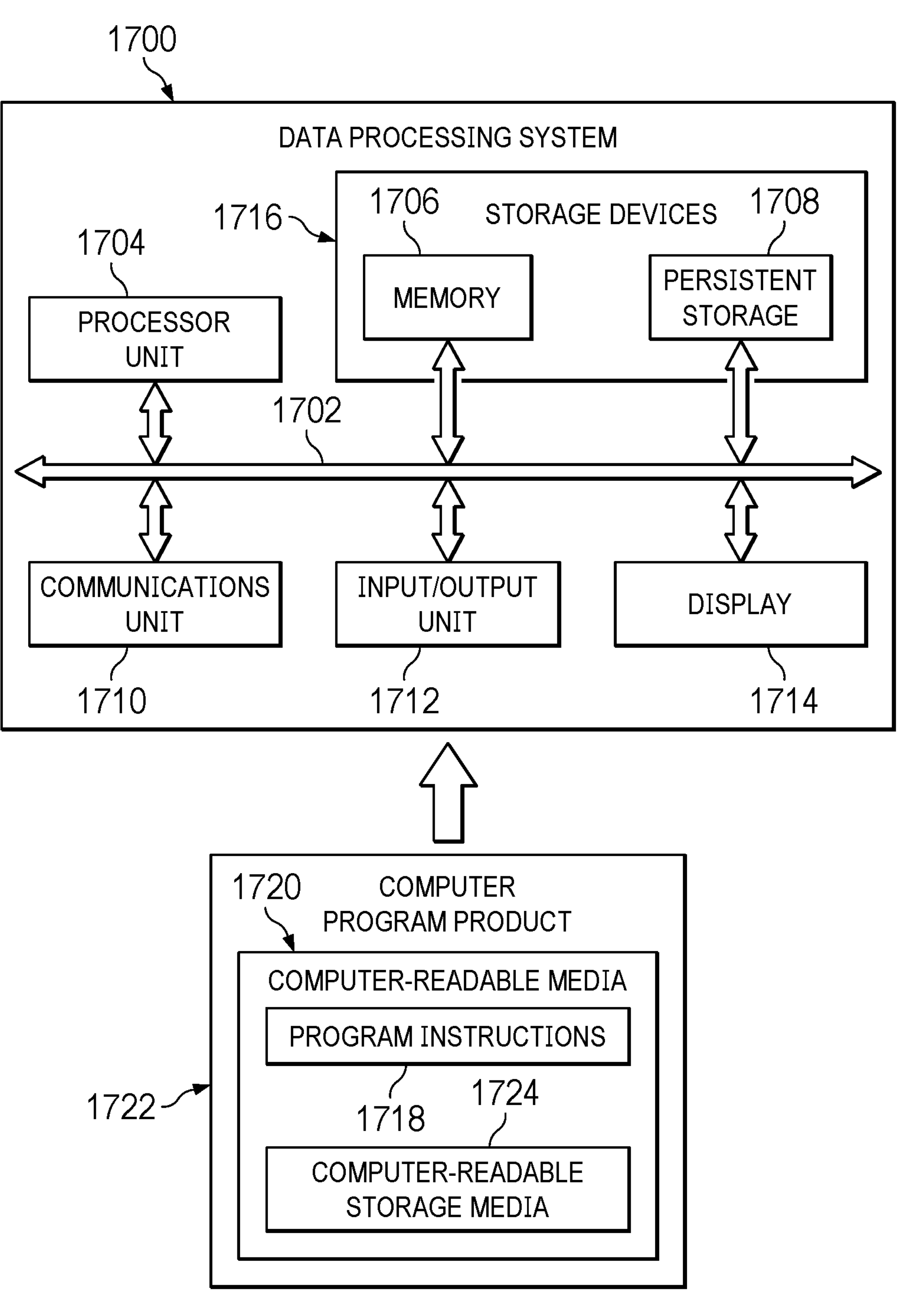
FIG. 17 is a block diagram of a data processing system in accordance with an illustrative embodiment.

Turning now to FIG. 17, a block diagram of a data processing system is depicted in accordance with an illustrative embodiment. Data processing system 1700 can be used to implement computers and computing devices in computing environment 100 in FIG. 1. Data processing system 1700 can also be used to implement computer system 212 including computing devices 220 in FIG. 2. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 takes the form of a bus system.

Processor unit 1704 serves to execute instructions for software that can be loaded into memory 1706. Processor unit 1704 includes one or more processors. For example, processor unit 1704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1704 can may be implemented using one or more heterogeneous processor systems in which a main processor is present with secondary processors on a single chip. As another illustrative example, processor unit 1704 can be a symmetric multi-processor system containing multiple processors of the same type on a single chip.

Memory 1706 and persistent storage 1708 are examples of storage devices 1716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, can be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 can be a hard drive, a solid-state drive (SSD), a flash memory, a rewritable optical disk, a rewritable magnetic tape, or some combination of the above. The media used by persistent storage 1708 also can be removable. For example, a removable hard drive can be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that can be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs can be located in storage devices 1716, which are in communication with processor unit 1704 through communications framework 1702. The processes of the different embodiments can be performed by processor unit 1704 using computer-implemented instructions, which may be located in a memory, such as memory 1706.

These instructions are referred to as program instructions, computer usable program instructions, or computer-readable program instructions that can be read and executed by a processor in processor unit 1704. The program instructions in the different embodiments can be embodied on different physical or computer-readable storage media, such as memory 1706 or persistent storage 1708.

Program instructions 1718 is located in a functional form on computer-readable media 1720 that is selectively removable and can be loaded onto or transferred to data processing system 1700 for execution by processor unit 1704. Program instructions 1718 and computer-readable media 1720 form computer program product 1722 in these illustrative examples. In the illustrative example, computer-readable media 1720 is computer readable storage media 1724.

Computer readable storage media 1724 is a physical or tangible storage device used to store program instructions 1718 rather than a medium that propagates or transmits program instructions 1718. Computer readable storage media 1724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1718 can be transferred to data processing system 1700 using a computer-readable signal media. The computer-readable signal media are signals and can be, for example, a propagated data signal containing program instructions 1718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1720" can be singular or plural. For example, program instructions 1718 can be located in computer-readable media 1720 in the form of a single storage device or system. In another example, program instructions 1718 can be located in computer-readable media 1720 that is distributed in multiple data processing systems. In other words, some instructions in program instructions 1718 can be located in one data processing system while other instructions in program instructions 1718 can be located in one data processing system. For example, a portion of program instructions 1718 can be located in computer-readable media 1720 in a server computer while another portion of program instructions 1718 can be located in computer-readable media 1720 located in a set of client computers.

The different components illustrated for data processing system 1700 are not meant to provide architectural limitations to the manner in which different embodiments can be implemented. In some illustrative examples, one or more of the components may be incorporated in or otherwise form a portion of, another component. For example, memory 1706, or portions thereof, may be incorporated in processor unit 1704 in some illustrative examples. The different illustrative embodiments can be implemented in a data processing system including components in addition to or in place of those illustrated for data processing system 1700. Other components shown in FIG. 17 can be varied from the illustrative examples shown. The different embodiments can be implemented using any hardware device or system capable of running program instructions 1718.

Thus, illustrative embodiments of the present invention provide a computer implemented method, computer system, and computer program product for authenticating a user to access a computer system. In the illustrative examples, the access is authenticated using the stylus that can transmit at least one of a stylus token or a stylus capacitance that are generated using a key stored in the stylus and a current timestamp. Additionally, the stylus can transmit locations determined using a global positioning sensor. These locations can be used to determine whether the user matches a historical location for the user or historical pattern of movement for the user. The user access can be authenticated based on whether a match to historical patterns for the location or movement of the user.

With the illustrative examples, increased security can be provided for users that have performed authentication to access a computing device or computing devices in an environment such as a server room in a data center. In addition to the credentials such as user ID, biometrics, or smartcard, the stylus assigned to a user can provide periodic or continuous authentication for a user to access a computer system such as a computing device. The transmission distances the stylus token and stylus capacitance can be selected to be sufficiently short such that the user is within a selected distance of the computing device for continued authentication to use the computing device.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for authentication using a stylus, the computer implemented method comprising:

generating, by the stylus, a stylus token using a key stored in the stylus and a current timestamp, wherein the stylus token is valid for a first selected period of time;

transmitting, by the stylus, the stylus token to a computer system;

repeating generating, by the stylus, the stylus token using the key stored in the stylus and the current timestamp and transmitting, by the stylus, the stylus token to the computer system in response to the stylus token expiring after the first selected period of time;

generating, by the stylus, a stylus capacitance of the stylus using the key stored in the stylus and the current timestamp, wherein the stylus capacitance is valid for a second selected period of time that is a longer period of time than the first selected period of time corresponding to how long the stylus token is valid;

transmitting, by the stylus, the stylus capacitance of the stylus to the computer system in response to the stylus touching a capacitive sensing device that is separate from and in communication with the computer system; and repeating, by the stylus, generating the stylus capacitance of the stylus using the key stored in the stylus and the current timestamp and transmitting, by the stylus, the stylus capacitance of the stylus to the computer system in response to an expiration of the second selected period of time that is the longer period of time than the first selected period of time corresponding to how long the stylus token is valid.

2. The computer implemented method of claim 1, wherein the stylus token is transmitted by the stylus to the computer system using a near field communications protocol.

3. The computer implemented method of claim 2, wherein a communication of the stylus with the computer system is one way from the stylus to the computer system.

4. The computer implemented method of claim 1, wherein the stylus includes a controller that controls a point of load voltage regulator in communication with a variable capacitor diode of a variable capacitance unit to transmit the stylus capacitance, and wherein the controller modulates the point of load voltage regulator to generate a voltage bias to cause the variable capacitor diode to generate the stylus capacitance that is transmitted to the capacitive sensing device that is separate from and in communication with the computer system using at least one of an electrical signal, a wireless signal, and an optical signal.

5. The computer implemented method of claim 1 further comprising:

determining, by the stylus, a stylus location for the stylus using a global positioning system sensor in the stylus; and transmitting, by the stylus, the stylus location to the computer system.

6. The computer implemented method of claim 1 further comprising:

generating, by the computer system, a device token using a user key for a user and the current timestamp;

comparing, by the computer system, the stylus token with the device token in response to receiving the stylus token from the stylus; and authorizing, by the computer system, the user to access the computer system in response to a match between the stylus token and the device token.

7. The computer implemented method of claim 6 further comprising:

blocking, by the computer system, the user to access the computer system in response to an absence of the match between the stylus token and the device token.

8. The computer implemented method of claim 1 further comprising:

generating, by the computer system, a device capacitance of the computer system using a user key for a user and the current timestamp;

comparing, by the computer system, the stylus capacitance of the stylus with the device capacitance of the computer system in response to receiving the stylus capacitance from the stylus; and authorizing, by the computer system, the user to access the computer system in response to a match between the stylus capacitance of the stylus and the device capacitance of the computer system.

9. The computer implemented method of claim 8 further comprising:

blocking, by the computer system, the user to access the computer system in response to an absence of the match between the stylus capacitance of the stylus and the device capacitance of the computer system.

10. The computer implemented method of claim 5 further comprising:

receiving, by the computer system, a set of locations based on time of day from the stylus to form a pattern of movement of a user based on the time of day;

comparing, by the computer system, the pattern of movement of the user based on the time of day received from the stylus with historical patterns of movement of the user in a database; and authorizing, by the computer system, the user to access the computer system in response to a match between the pattern of movement of the user based on the time of day with one of the historical patterns of movement of the user.

11. An authentication system comprising:

a stylus that operates to:

generate a stylus token using a key stored in a memory in the stylus and a current timestamp, wherein the stylus token is valid for a first selected period of time;

transmit the stylus token to a computer system;

repeat generating, by the stylus, the stylus token using the key stored in the memory in the stylus and the current timestamp and transmitting, by the stylus, the stylus token to the computer system in response to the stylus token expiring after the first selected period of time;

generate a stylus capacitance of the stylus using the key stored in the stylus and the current timestamp, wherein the stylus capacitance is valid for a second selected period of time that is a longer period of time than the first selected period of time corresponding to how long the stylus token is valid;

transmit the stylus capacitance of the stylus to the computer system in response to the stylus touching a capacitive sensing device that is separate from and in communication with the computer system; and repeat generating, by the stylus, the stylus capacitance of the stylus using the key stored in the stylus and the current timestamp and transmitting, by the stylus, the stylus capacitance of the stylus to the computer system in response to an expiration of the second selected period of time that is the longer period of time than the first selected period of time corresponding to how long the stylus token is valid.

12. The authentication system of claim 11, wherein stylus that operates to:

determine a stylus location for the stylus using a global positioning system sensor in the stylus; and transmit the stylus location to the computer system.

13. The authentication system of claim 11 further comprising:

a number of processor units, wherein the number of processor units executes program instructions to:

generate a device token using a user key for a user and the current timestamp;

compare the stylus token with the device token in response to receiving the stylus token from the stylus; and authorize the user to access the computer system in response to a match between the stylus token and the device token.

14. The authentication system of claim 13, wherein the number of processor units executes program instructions to:

block the user to access the computer system in response to an absence of the match between the stylus token and the device token.

15. The authentication system of claim 13, wherein the number of processor units executes program instructions to:

generate a device capacitance of the computer system using a user key for a user and the current timestamp;

compare the stylus capacitance of the stylus with the device capacitance of the computer system in response to receiving the stylus capacitance from the stylus; and authorize the user to access the computer system in response to a match between the stylus capacitance of the stylus and the device capacitance of the computer system.

16. The authentication system of claim 15, wherein the number of processor units executes program instructions to:

block the user to access the computer system in response to an absence of the match between the stylus capacitance of the stylus and the device capacitance of the computer system.

17. The authentication system of claim 13, wherein the number of processor units executes program instructions to:

receive a set of stylus locations based on time of day from the stylus to form a pattern of movement of a user based on the time of day;

compare the pattern of movement of the user based on the time of day received from the stylus with historical patterns of movement of the user in a database; and authorize the user to access the computer system in response to a match between the pattern of movement of the user based on the time of day with one of the historical patterns of movement of the user.

18. A stylus comprising:

an elongate body;

a memory in the elongate body, wherein a key is stored in the memory;

a near field communications transmitter in the elongate body, wherein the near field communications transmitter transmits radio frequency signals;

a variable capacitance unit in the elongate body, wherein the variable capacitance unit transmits a stylus capacitance of the stylus to a computer system in response to the stylus touching a capacitive sensing device that is separate from and in communication with the computer system; and a controller in the elongate body, wherein the controller operates to:

generate a stylus token using the key stored in the memory in the elongate body and a current timestamp, wherein the stylus token is valid for a first selected period of time;

control the near field communications transmitter to transmit the stylus token to the computer system using the radio frequency signals;

generate the stylus capacitance of the stylus using the key stored in the memory in the elongate body and the current timestamp;

control the variable capacitance unit to transmit the stylus capacitance of the stylus to the computer system in response to the stylus touching the capacitive sensing device that is separate from and in communication with the computer system, wherein the stylus capacitance is valid for a second selected period of time that is a longer period of time than the first selected period of time corresponding to how long the stylus token is valid;

repeat generating the stylus token using the key stored in the memory in the elongate body and the current timestamp and controlling the near field communications transmitter to transmit the stylus token to the computer system using the radio frequency signals in response to the stylus token expiring after the first selected period of time; and repeat generating the stylus capacitance of the stylus using the key stored in the memory in the elongate body and the current timestamp and controlling the variable capacitance unit to transmit the stylus capacitance of the stylus to the computer system in response to an expiration of second selected period of time that is the longer period of time than the first selected period of time corresponding to how long the stylus token is valid.

* * * * *